Figure 1:
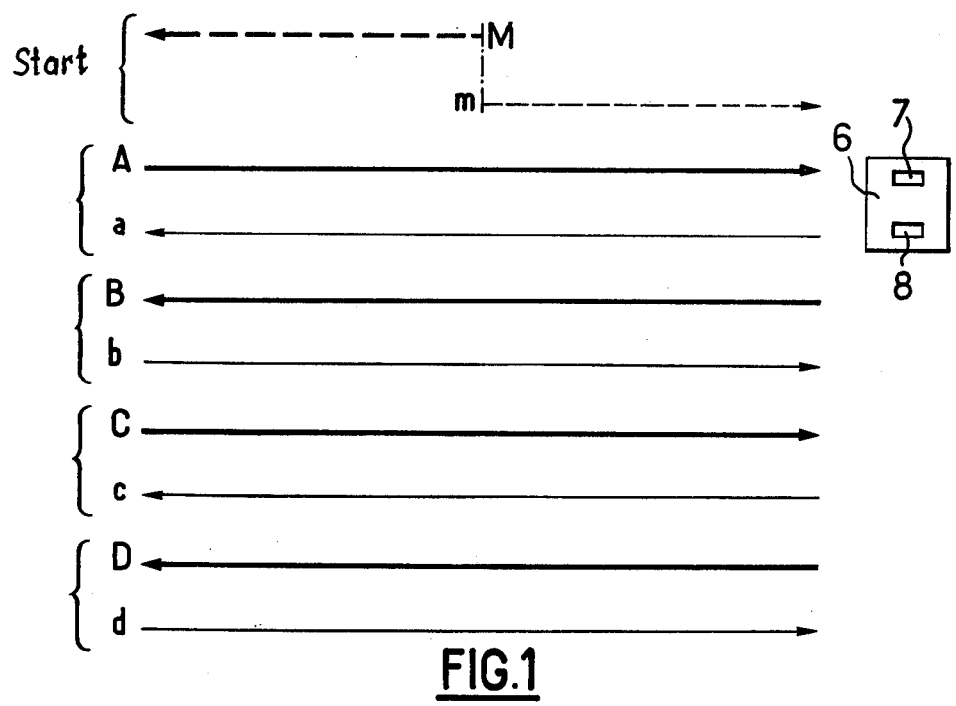

United States Patent [19]

Blazevic

[11] 4,138,696

[45] Feb. 6, 1979

[54] DEVICE FOR AUTOMATICALLY RECORDING, REPRODUCING AND TRANSLATING, A MAGNETIC TRANSDUCER

[76] Inventor: Milos Blazevic, 62, rue Georges Ferrand, 94380 Bonneuil-sur-Marne, France

[21] Appl. No.: 768,563

[22] Filed: Feb. 14, 1977

[30] Foreign Application Priority Data

Mar. 25, 1976 [FR] France .................... 76 08629

[51] Int. Cl.² .................................... G11B 25/04
[52] U.S. Cl. .................................... 360/2; 235/449
[58] Field of Search .................. 360/2; 235/61.11 D

[56] References Cited

U.S. PATENT DOCUMENTS

| | | | |
|---|---|---|---|
| 3,685,836 | 8/1972 | Chernowitz | 360/2 |
| 3,795,794 | 3/1974 | Figuls | 360/2 |
| 3,899,659 | 8/1975 | Nakai | 360/2 |
| 3,925,814 | 12/1975 | Chernowitz | 360/2 |
| 4,031,359 | 6/1977 | Christou | 360/2 |
| 4,040,097 | 8/1977 | Mizuno | 360/2 |

*Primary Examiner*—Jay P. Lucas
*Attorney, Agent, or Firm*—Brisebois & Kruger

[57] ABSTRACT

Apparatus for the recording, reproducing and automatic translation of the type utilizing rectangular magnetic cards with lines of writing on their fronts and magnetic tracks on their backs explored alternatively from left to right and from right to left by a movable magnetic head, said apparatus being characterized by the fact that each line of writing on the front corresponds to two recording tracks on the back, that each upper track of a line is traversed in the direction opposite to that of the upper track of the preceding line, that each lower line is traversed in a direction opposite to the direction of travel along the upper track of the corresponding line, the apparatus being so arranged as to permit a choice between four different patterns of travel.

5 Claims, 7 Drawing Figures

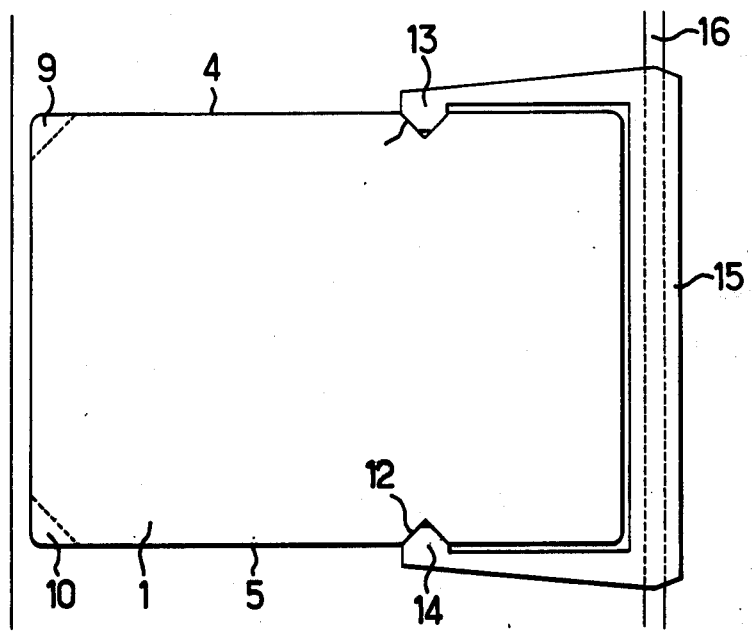
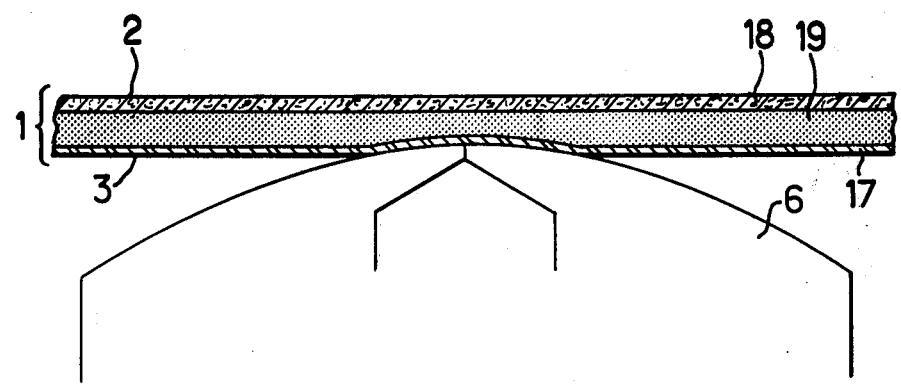

DEVICE FOR AUTOMATICALLY RECORDING, REPRODUCING AND TRANSLATING, A MAGNETIC TRANSDUCER

This invention relates to word-processing devices utilizing magnetic cards and of the type described in U.S. Pat. No. 3,671,044.

This type of apparatus utilizes rectangular magnetic cards carrying on their front surfaces, visible at their tops, successive lines of writing which are readable from left to right and on their rear surfaces a magnetic coating adapted to permit the recording and reproduction of sound on successive parallel tracks traversed by a magnetic head which moves alternately from left to right and from right to left, reversing its direction of movement at the end of each line, when it skips to the following line, usually as a consequence of vertical displacement of the card. The sound may, for example, correspond to the pronunciation of the written line or its translation into another language. The object of the invention is to improve the variety of usages which may be made of the device without significantly increasing its technological complexity.

The invention consists in recording, for each line of writing on the front surface, two sound tracks on the rear surface, to wit, an upper sound track and a lower sound track, the lower sound track being always traversed in the direction opposite to that of the upper sound track and the apparatus being so arranged that it may function, as desired, according to any one of four patterns of travel. The first consists in reading alternately from left to right and right to left all the upper tracks. The second consists of reading alternately from right to left and from left to right all the lower tracks. The third consists in reading alternately the upper track of an odd line, the lower track of the same line, a lower track of the next even line, and then the upper track of said even line. Finally the fourth pattern consists in reading successively an upper track followed by a lower track of the same line and then moving the head in an inactive, that is to say a silent manner, to the other end to traverse again an upper track and then the lower track of the next line, and so forth.

In particular this pattern of travel may be obtained in accordance with the invention by using a double magnetic head, the two parts of which correspond to the tracks of a single line and may be switched from one to the other, while the skip from one line to the next is obtained in a mechanical manner, generally by displacement of the cards from bottom to top. The two first patterns of travel are thus obtained by substituting the mechanical skip which is normal at each end of the line without switching from one head to the other, while the third pattern of travel is attained by causing the mechanical skip to take place at each end of the left line and the switching at each end of the right line, and the fourth pattern of travel is obtained by alternately producing switching only for each sequence of three line ends, followed by a skip and switching with stopping of the sound, and finally the re-establishment of the sound only.

For each pattern of travel one may voluntarily cause recording or reproduction of the sound and, in accordance with the invention, each card comprises two notched zones on which two feelers bear which prevent a shift from reading to recording separately for the upper tracks and for the lower tracks, so as to effectively prevent erasure of each series of tracks when the corresponding notch is present.

The card also preferably comprises two V-shaped notches on two opposite horizontal edges which cooperate with the fingers of corresponding shape on the apparatus to assure correct positioning of the card. Finally, in accordance with the invention, the magnetic conductor is deposited on a thin sheet of polyester or similar material attached to the back of the rigid support for the card by means of a flexible layer of foam.

Other specific features of the invention will become apparent in the course of the following description of one embodiment, taken purely by way of example, and illustrated on the accompanying drawings, in which:

FIG. 1, including A through D, is a schematic diagram of the arrangement of the tracks;

FIGS. 2, 3, 4 and 5 all including A through D, represent on a smaller scale patterns corresponding respectively to the four methods of travel;

FIG. 6 is a partial view of the apparatus with its card and its centering means; and FIG. 7 shows on a larger scale a transverse section of the card and of the magnetic head in the direction of a line.

The card according to the invention indicated by reference numeral 1 on FIG. 6, preferably comprises on its front surface 2 shown on FIG. 7, 26 lines of text which makes it possible to identify these lines by the 26 letters of the alphabet from A to Z. In addition to these 26 indicated lines one may also provide two supplementary starting and end lines as explained hereafter. At the same time the rear surface 3 of this card comprises twice as many, that is to say 52 magnetic lines represented by horizontal arrows on FIG. 1 so that two magnetic tracks on the rear surface, the uppermost of which, that is to say, the one toward the upper edge 4 of the card and the lowermost, that is to say the one toward the bottom edge 5 of the card, correspond to one line of writing on the front surface. All the upper tracks shown in broken lines on FIG. 1 may also be designated by the 26 capital letters from A to Z while the lower tracks shown in thin lines on FIG. 1 may be designated by the corresponding lower case letters from a to z.

In accordance with the invention, each lower track such as a, b, etc. is traversed in the direction opposite to the corresponding upper track A, B, etc. At the same time, in each series, the tracks are alternately travelled from left to right and from right to left. This leads among other possibilities to the arrangement shown in FIG. 1 in which it is seen that the two successive tracks a and B are traversed in the same direction as b and C, c and D, etc.

Figure 2:
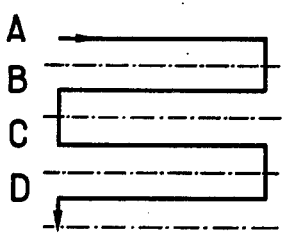

This arrangement makes it possible to easily provide the four following patterns of travel:

The first method which is shown in FIG. 2 consists in successively traversing A, B, C, D, etc.

Figure 3:
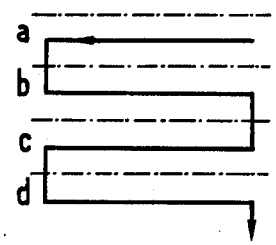

The second method is represented on FIG. 3 and consists in traversing successively a, b, c, d, etc.

Figure 4:
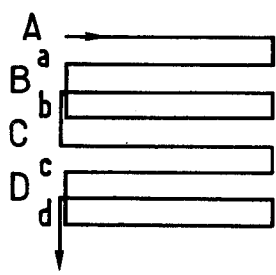

The third method which is illustrated on FIG. 4 consists in traversing successively A, a, b, B, C, c, d, D, and so forth.

Figure 5:
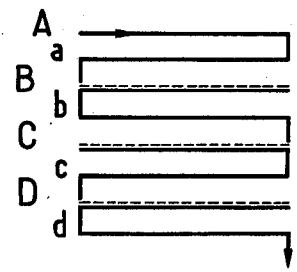

Finally, the fourth pattern of travel, illustrated on FIG. 5, consists in traversing successively A and a, then moving from left to right in an inactive manner, then traversing B and b, then moving from right to left in an inactive manner to reach C and c, and so on.

The first pattern of travel makes it possible, for example, to read or record the pronunciation corresponding to the written part of the corresponding line on the front surface while the second pattern of travel may correspond to the sound corresponding to the translation of this same text. The third method of exploration corresponds to the continuous reading of 52 tracks to utilize the maximum capacity for recording sound, without any particular distinction between the tracks.

Finally, the fourth mode of travel makes it possible to hear or record successively the text and its translation or a question and its response and this separately and successively for each of the lines of writing.

These various patterns of travel are associated with the same arrangement of the tracks on the card and may be obtained by various combinations of methods of relatively displacing the card and the magnetic head. In particular, it is recommended according to the invention to use a double magnetic head indicated by reference numeral 6 on FIGS. 1 and 7 and which comprises two parts, each having its own pole gap and winding, these parts being designated by reference numeral 7 respectively for the upper part and 8 for the lower part. Naturally these parts are as close as possible and their positions correspond for each movement of the magnetic head 6 to respective travel by said parts along an upper track and a lower track. This makes it possible to use the mechanism enabling one to skip from line to line either by displacement from top to bottom of the head or more generally by displacement from bottom to top of the card, each mechanical skip thus corresponding exactly to the pitch of a line of writing along the front of the card. Naturally, none of the reversing mechanism for reversing the direction of movement of the head at each end of the line has changed.

In this case the first method of travel, corresponding to FIG. 2, is obtained by simply letting the skipping mechanism operate at the end of each line, both at the right and the left, while leaving the upper part of the magnetic head constantly switched on from one end to the other of the card. In this way, the method of exploration of FIG. 3 is obtained by mechanically skipping at each end of the line and holding the lower part 8 of the head constantly switched on.

The third pattern of travel represented on FIG. 4 is obtained in a very simple manner thanks to the arrangement indicated, by requiring a mechanical skip at all the ends of the lines at the left and requiring switching from one of the parts 7 and 8 of the head to the other at each right end of a line.

Finally, the fourth pattern of travel represented on FIG. 5 is obtained by starting with the upper part 7 switched on and switching from one head part to the other at the right end of the track only, then mechanically skipping switching head parts at the end of the line at the left at the same time that the sound is stopped, and then turning on the sound without skipping and without switching head parts at the right end of the line, after which the same cycle is reproduced with movement in the opposite direction, and so forth.

It should always be noted that the second pattern of travel begins at the right, while the first pattern as well as the third and fourth begin at the left. For this reason two supplementary lines are provided, one of which is a zero or starting line and one 27 or an end line. These two lines are not used when recording sound, but are adapted to comprise, if desired, material such as the title or the references. On the other hand, before starting any pattern the magnetic head is systematically stopped in the center of the starting line at the point marked M—M on FIG. 1, and all patterns thus begin with a single inactive half-line. In effect, there is at the zero line, whether written or not, corresponding to the rear surface an imaginary upper track in the region M and an imaginary lower track in the region m, the directions of travel being those of even lines (zero being considered as even). The first pattern of travel is initiated by switching on the head on the upper part 7 located at M using the corresponding direction of travel. The half-line M is traversed to the left and silently since nothing has been recorded. Then the skip to the first line permits travel to the left. The second pattern of exploration is produced by the part 8 using the corresponding direction so that the half-line m is traversed toward the right to begin the travel to the right. For purposes of simplification these inactive displacements shown in broken lines on FIG. 1 have not been shown on FIGS. 2 to 5.

In like manner, when the head arrives at the end of the line 26, it travels in the corresponding direction and silently halfway along the line 27 (the end line) to stop in the middle of this line (not shown on these figures) ready for a new pattern of travel of any one of the four types.

In the patent referred to above a position indicator is provided which moves along the written line and always from left to right. In the present invention this mechanically displaced indicator is replaced by an electric cursor which moves along a series of successive contacts which light a series of stationary electric bulbs constituting a luminous indicator. In addition the contact in the middle of the series serves at the same time to bring about the stopping of the head at the center of the line.

Finally, it will be seen that all these patterns of travel may be obtained in an extremely simple manner from a single control console, preferably electronic, provided that the skipping mechanism is electrically actuated.

As a supplemental improvement, two sets of notches are provided in any position on the edges of the card, or two truncated zones are provided at the two corners of the cards as shown at 9 and 10 on FIG. 6, and the apparatus comprises two feelers actuated by these notches or truncations and making it possible to prevent passage from reading to recording separately for the upper tracks and the lower tracks.

For example, the truncation 9 may prevent the rerecording with erasure of the upper track while the truncation 10 produces the same result for the lower tracks. Naturally, if the two truncations 9 and 10 or the two notches are formed simultaneously any possible erasure of the card is prevented and it then becomes a single reading.

The improvement may be naturally used with all the patterns of travel described, but is particularly valuable with the fourth pattern of travel since this latter exploits separately and successively the two tracks of each line. In this case, in effect, one obtains automatically and without any supplementary device, all the switchings necessary without having to intervene manually. For example, if one has formed a notch or truncation blocking the upper tracks and not the lower tracks and if, on the other hand, one actuates the button or combination of buttons for the fourth method of exploration as well as the button for recording, the latter is suppressed and automatically replaced by reading only in the first travel along line A, and then at the end of the line the apparatus passes automatically to recording and travels over line a, then the red signal which habitually signals recording goes out for the return in silence from left to right, and one begins to read the track B, and then passes automatically to recording while following track b and so on. By way of example, the apparatus may read a phrase of a foreign language, and record the pupil pronouncing this same phrase before passing to the next. It may also pose a question and automatically record the answer or any other desired combination. One thus sees that the new arrangement is extremely rich in possible methods of utilization. With respect to the manual control of the four patterns of travel, it is possible to use four separate buttons, but it is also possible to use only two buttons, one corresponding, when it is depressed, to the travel along A-Z and the other to a-z. The depression of the two buttons causes reading of the 26 lines according to the third pattern of travel and finally the release of the two buttons may be convention correspond to the fourth pattern of travel.

To assure good centering of the magnetic card while leaving the edges of this card necessary for the preceding notches free, it is suggested according to the invention to provide two supplemental notches 11 and 12 shown on FIG. 6 having a V-shaped profile on the two edges 4 and 5 of the card. These notches then cooperate with two centering fingers 13 and 14 having a corresponding profile fixed to a member 15 in the form of a clip having slightly elastic arms which thus takes all of the play and insures rigorous centering, both in position and in orientation, of the magnetic card 1. At the same time the member 15 slides on a rail 16 and thus serves as a carriage to insure the displacement of the card. The previously described feelers (not shown on the figure) may also be carried by this movable member 15.

This arrangement makes it possible, as in the above-mentioned patent, to slide the card over a fixed platen (not shown) provided with only a horizontal exploration window for the magnetic head. Moreover the card may advantageously be covered by a transparent wall. Habitually the magnetic head 6 is mounted on a spring so as to be pressed elastically against the back 3 of the magnetic card which is thus lifted and subjected to pressure beneath this transparent wall. However, by reason of the substantial inertial mass which the recording head has, the effort of pressing the latter against the card is necessarily itself relatively substantial, which leads to a substantial wear on the magnetic coating, and on the other hand, despite this force, the head remains sensitive to shocks undergone by the apparatus.

In order to avoid this defect, the invention provides for mounting the magnetic head with little or no elasticity and to make the magnetic card itself elastic in the direction of its thickness. For this purpose, the magnetic coating is positioned on the lower face 3 of a thin sheet of polyester 17 shown on FIG. 7, said sheet being itself connected to the rigid support 18 of the card, which may be made of cardboard, by a compressible layer 19 made of a thin plastic foam or other product compressible in thickness.

As a result of this arrangement the pressure of the magnetic layer 3 on the head is regulated to a very low value by the compression of the relatively flexible layer 19 and the inertia of the part of the sheet thus displaced is practically negligible. It follows that the apparatus is absolutely insensitive to shocks which is very important for a portable apparatus and, on the other hand, the foam imperatively dampens all sorts of mechanical longitudinal or transverse vibrations which may propagate in the magnetic layer in response to movement of the head 6.

What is claimed is:

1. An automatic device for recording, reproducing and translating said device being of the type using magnetic rectangular cards having visible horizontal lines of writing on their front surfaces which are readable from left to right, and a magnetic coating on their rear surfaces to support mangetic tracks traverse alternately from left to right and from right to left by a movable magnetic head, a skipping mechanism for producing relative displacement between said cards and device to permit passage from one line to the next, the improvement according to which each line of writing on the front surface corresponds to two tracks on the rear surface of each card, namely an upper track and a lower track, each upper track of a line is traversed by said head in a direction opposite to that of the upper track of the preceding line and that each lower track is traversed in a direction opposite to the direction of travel over the upper track of the corresponding line, said device being arranged to permit the choice between four different patterns of travel the first corresponding to the alternate travel along the upper tracks, the second corresponding to the alternate travel along the lower tracks, the third corresponding to the alternate travel along the upper track of a first line, followed by the lower track of the same line, the lower track of the next line, and finally the upper track of the next line, and the fourth method of exploration corresponding to the exploration of an upper track of a first line, then the lower track of the same line, then an inactive return to the other end of the track to subsequently traverse the upper track of the following line and the lower track of the same following line, and so on.

2. Apparatus according to claim 1 in which the card comprises, on each of two horizontal opposite edges, a substantially V-shaped centering notch and a positioning notch cooperating with fingers of corresponding shape carried by a member substantially in the form of a clip constituting a carriage for displacing the card.

3. Magnetic card for the apparatus according to claim 1 comprising a front surface with lines of writing readable from left to right and on the opposite surface magnetic tracks readable alternately from left to right and from right to left, in which each line of writing of the front corresponds to two magnetic tracks on the rear surface, one upper and one lower, the lower track of each line being adapted to be traversed in the opposite direction to that of the upper track of the corresponding line, and the upper track of each line being adapted to be traversed in a direction opposite to that of the upper track of the preceding line.

4. Magnetic card according to claim 3 which comprises two substantially V-shaped centering notches respectively in its upper edge and at its lower edge.

5. Magnetic card as claimed in claim 3 in which the magnetic coating is positioned on the lower surface of a thin resistant sheet mounted beneath the rigid support of the card by means of a layer of compressible material characterized by the fact that the compressible material consists of a thin layer of expanded plastic material.

* * * * *